(12) United States Patent
Ronchi et al.

(10) Patent No.: US 6,496,836 B1
(45) Date of Patent: Dec. 17, 2002

(54) SYMBOL-BASED MEMORY LANGUAGE SYSTEM AND METHOD

(75) Inventors: Martino Ronchi, Melzo (IT); Bruce L. Belfiore, Princeton, NJ (US)

(73) Assignee: Belron Systems, Inc., Princeton, NJ (US)

(*) Notice: Subject to any disclaimer, the term of this patent is extended or adjusted under 35 U.S.C. 154(b) by 0 days.

(21) Appl. No.: 09/467,783

(22) Filed: Dec. 20, 1999

(51) Int. Cl.[7] .............................................. G06F 17/30
(52) U.S. Cl. ....................... 707/104.1; 709/206; 710/8; 379/226; 455/456; 340/7.56
(58) Field of Search ........................... 709/206; 710/8; 379/226, 88.12; 340/7.56; 455/456; 707/104.1

(56) References Cited

U.S. PATENT DOCUMENTS

| | | | |
|---|---|---|---|
| 5,333,266 A | * 7/1994 | Boaz et al. | 709/206 |
| 5,387,783 A | * 2/1995 | Mihm et al. | 235/375 |
| 5,675,733 A | * 10/1997 | Williams | 709/206 |
| 5,734,568 A | * 3/1998 | Borgendale et al. | 364/478.12 |
| 6,018,577 A | * 1/2000 | Roach, Jr. | 379/229 |
| 6,091,956 A | * 7/2000 | Hollenberg | 455/456 |
| 6,104,500 A | * 8/2000 | Alam et al. | 358/1.15 |
| 6,313,736 B1 | * 11/2001 | Hymel et al. | 340/7.56 |
| 6,333,973 B1 | * 12/2001 | Smith et al. | 379/88.12 |
| 6,345,318 B1 | * 2/2002 | Gamon | 710/8 |

OTHER PUBLICATIONS

*Il futuro dell a communicazione: il Memory Language System*, Martino Ronchi, (Franco Angeli: Italy) 1995.
"7 note per il telemarketing", Di Anna Goffi, Italia Oggi, Oct. 17, 1994.
*Memory Language System*, M. Ronchi, 1997–99 marketing materials, pp. 1–5.

* cited by examiner

Primary Examiner—Charles L. Rones
(74) Attorney, Agent, or Firm—Jacobson Holman PLLC

(57) ABSTRACT

A method using symbols to gather, store, retrieve, manipulate and report information, with attendant improvements in communication, efficiency and efficacy. A customer communication received by an organization is assigned a symbol on the basis of key words within the communication and/or a record of transaction between the customer and the organization. The communication is directed to a communication handler appropriate to the assigned symbol. Using symbols, the customer can provide inputs to the organization regarding satisfaction with the transaction; the organization can then compare these symbols with internally reported symbols to ascertain an accuracy level of the organization's perception of the transaction.

19 Claims, 7 Drawing Sheets

FIG. 7
 60
 61
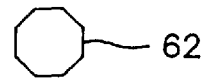 62
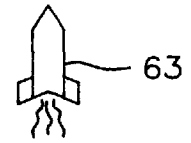 63
 70
 71
 72
 73
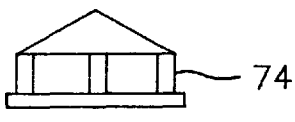 74
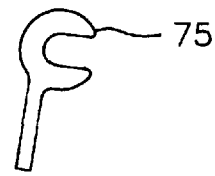 75
 76
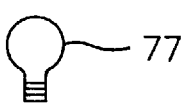 77
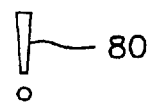 80
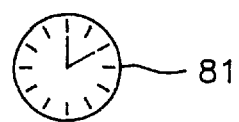 81
 82
 83
 84
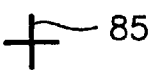 85
 86
 87
 88
 89

SYMBOL-BASED MEMORY LANGUAGE SYSTEM AND METHOD

BACKGROUND OF THE INVENTION

1. Field of the Invention

The present invention is related to the field of communication and, more particularly, to a symbol/graphic-based methodology usable in many applications to improve the recordation, display and manipulation of useful information to improve and enhance the efficiency of various forms of communications.

2. Description of the Related Art

A system known as the Memory Language System has been developed by Martino Ronchi for use in connection with telephone solicitation. When communicating with potential clients or customers over the telephone, it was learned that numerous calls were often required to reach a positive conclusion. Text-based handwritten notes taken during a series of follow-up calls were often confusing and opportunities were lost due to miscommunication over the ongoing follow up process.

To keep better track of the information garnered, as well as the next steps which needed to be taken, a system of symbols was developed. These symbols included what were referred to as container symbols and auxiliary symbols, the auxiliary symbols being placed within the container symbols.

Container symbols act like verbs in a sentence. They indicate the next step that the user or customer is expected to take. Auxiliary symbols act like adverbs, adjectives and expletives, modifying the container symbol and adding richness of detail in the form of information useful for achieving the desired ultimate result. Finally, two "end-game" symbols are used to indicate positive or negative closure of the item or transaction.

Container symbols include a square, used to indicate that an outbound call is required; and a circle, used to indicate that an inbound call is expected. Auxiliary symbols include a triangle, used to indicate the presence of a problem or that expectations about the outcome of the solicitation are negative; arrows, indicating whether an action should be taken "tomorrow" or "today", dependent upon the arrow direction; an exclamation point, indicating that the action or matter is "important"; and a question mark, indicating a question to be answered or information to be supplied before the action may be resolved. End-game symbols include "O.K." and "NO", indicating positive and negative outcomes, respectively.

A container symbol may convey further information through enhancement of the thickness of its border. For example, when the border of the square or circle is thickened, doubled or otherwise visibly modified, this can indicate an exercise of judgment by the user that the probable outcome of the process will be favorable.

Through the use of these symbols, notes summarizing each call may be automated and consistently presented, reducing the time needed to record and review the call summary.

When developed into call center software, the memory language system methodology made it possible to reduce so-called "talk time" and "wrap time", but more importantly it increased accuracy and efficacy (measured by final positive results). The resulting improvement in profits and results was truly dramatic for call centers. The implications were particularly important given the heavy turnover of personnel which characterizes that industry.

The use of symbols to communicate information in commercial and non-commercial media is underutilized at the present time. This underutilization is costly in terms of time and money, human error and lost information. In a world where quick and precise conveyance of concepts and accurate indication of follow up actions are vital to success, the proper utilization of symbols can fill important needs.

Through greater use of symbols, information may be recorded via the click of a mouse with reduced text writing requirements. The nature of the symbols also reduces the likelihood of mistakes and miscommunication, even across languages and cultures. It should be noted as well that dyslexia, which affects a significant percentage of the population to one degree or another, is now understood to be a phonemic-based, i.e., written word-based, difficulty, rather than a symbol-based difficulty. Thus, greater use of symbols instead of words can both increase the pool of qualified people who could utilize this system and increase efficiency over a text-based system.

With the growth of distributed computer systems such as the Internet, the customer's expectation of reliability, speed and intimacy in communication with an organization is increasing, regardless of the nature of the organization. It is no longer enough to use technology and methodology that competes effectively with others in your specific industry because customers expect technology and methodology that matches that used by any industry with which they have interacted. In addition to wanting consistency between organizations, customers want a consistent interface with a particular organization, regardless of the method of contact initiated, i.e., facsimile, email, etc.

In view of the foregoing, every organization must find a way to record information pertaining to their customers quickly, and to access this information consistently, without delay, and in a readily understandable format in order to best satisfy the expectations of their customers during each and every transaction. The symbol-based system and method of the present invention provides such a way.

SUMMARY OF THE INVENTION

A general object of the invention is to render the recording, storing and retrieval of information in a broad variety of contexts more efficient and efficacious through the use of standardized and personalized symbols, thereby reducing costs and improving results.

Another object of the invention is to increase the accuracy and reliability of information gathered through the use of both standardized and personalized symbols.

A further object of the invention is to give clear indications, through the use of symbols, of the next steps the user should take in virtually any business or non-business context. By combining this functionality with an "alarm screen" function, the user can be informed when the steps need to be taken.

A still further object of the invention is to provide an intuitive means whereby customers can provide direct input to an organization regarding the customer's level of satisfaction with a transaction, which input can then be efficiently compared with the organization's perception of the success of the transaction, through the use of symbols.

Another object of the invention is to render training easier and less costly to companies and individuals by providing people with intuitive, easy-to-understand symbolic tools in their work or other environments.

An additional object of the invention is to allow managers to sort information more easily, via use of the symbols. This can be important both for purposes of apportioning out work to people who are best able to deal with certain situations, and for purposes of generating analytical and summary reports of work done or in progress.

A further object of the invention is to provide an intelligent system for routing and call allocation in which inbound emails, faxes, etc., are routed via computerized textual analysis, e.g., using key words, to "tag" communications.

Another object of the invention is to provide corporations and communities with a symbol-based methodology which reduces or eliminates barriers of language, dialect and culture, improving information flow and understanding, and leading to better and more efficient communications.

Another object of the invention is to give managers and individuals a standardized, symbol-connected method for recording the outcome of transactions that can be used subsequently by appropriate third parties.

According to the present invention, as embodied and broadly described herein, a system and method for improving the handling and communication of information in a wide variety of contexts, through the use of symbols, is provided. In accordance with the method, a communication is received by an organization and a source of the communication is identified. A memory resident at the organization is accessed to determine whether a record of transaction exists for the identified source. Any symbols stored in the memory are reviewed for input as to how to direct the communication. If there is no record of transaction, or if there is a record but the stored symbols are not dispositive of the next action, key words are identified in the communication and a symbol is assigned to the communication on the basis of the key words identified. A representation of the assigned symbol is then stored in the memory and the communication is directed to a communication handler appropriate for the assigned symbol.

The method may further comprise the steps of receiving a plurality of communications, assigning a symbol to each communication, and then sorting the plurality of communications into groups on the basis of the symbol or symbols assigned to each. Groups of communications are then directed to communication handlers appropriate for the symbol common to each group.

According to the present invention, the method also includes assigning more than one symbol to each communication. In one such embodiment, a first symbol is assigned based on key words within the communication and a second symbol is assigned which reflects a projected outcome of the transaction. Routing of the communication to an appropriate handler may depend on one or both symbols. Once the transaction is complete, a third symbol is assigned which reflects the actual outcome of the transaction. The second symbol may then be compared with the third symbol to determine the accuracy of the projected outcome and/or the impact of the handling of the transaction on the outcome.

The method also includes receiving customer inputs relative to a transaction, the inputs being provided through the use of symbols. Such inputs may include symbols indicating a desired next action, level of satisfaction with the transaction, degree of urgency, etc. Once received by the organization, these inputs are compared with organizationally assigned symbols, also indicating a desired next action, level of satisfaction with the transaction, degree of urgency, etc., to determine an accuracy of the organization's perception of the transaction.

According to an alternative embodiment of the method for enabling the customer to initiate a transaction, the customer enters symbols over an electronic interface through which an action and desired timeframe for performing such action are specified. In response to receipt of the symbols, the organization performs the action and the customer provides feedback in the form of a third symbol, indicating a level of satisfaction. Through such customer-initiated transactions, the customer's needs can be specifically addressed in a timely, focused and efficient manner. The use of symbols provides a consistent interface and a uniform "language" between the customer and the organization.

These and other objects of the invention, as well as many of the intended advantages thereof, will become more readily apparent when reference is made to the following description taken in conjunction with the accompanying drawings.

P BRIEF DESCRIPTION OF THE DRAWINGS

FIG. 7 illustrates sample symbols in accordance with the present invention.

DETAILED DESCRIPTION OF THE PREFERRED EMBODIMENTS

Figure 1:
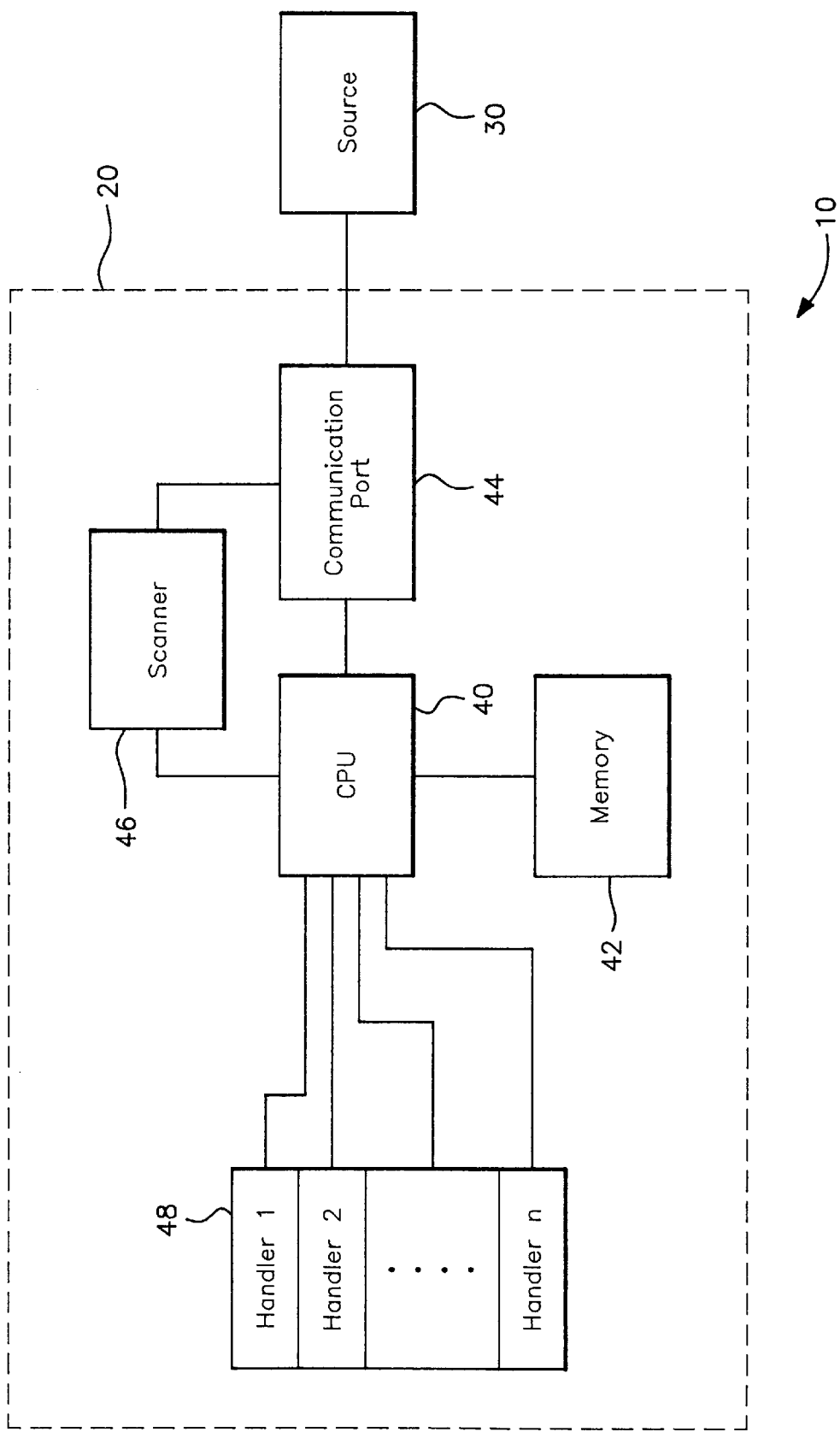
FIG. 1 is a block diagram of an exemplary symbol-based system in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

In today's highly competitive market, it is important not only to acquire new customers but to achieve as high a level of satisfaction among existing customers as possible. Customers want to believe that an organization remembers them to the same extent that the customer remembers the organization. Therefore, it is important not to irritate existing customers by asking them for the same information they have previously provided, or by any other form of interaction that leads them to feel that their prior course of dealing with the organization places them on no better footing than that afforded a first-time contact.

Accordingly, it is becoming increasingly important to organizations to know specifically to whom they are speaking and to tailor their treatment of each customer to best suit that customer. This knowledge of each customer may be accumulated through careful tracking of each conversation, or other interaction with the customer, and recording of information therefrom. Symbols provide an ideal way of summarizing such information in a readily understandable and consistent format so that new organizational representatives, or those otherwise unfamiliar with the customer, can be brought up to speed quickly on a particular customer's needs and previous history with the organization.

Sources of communication to which an organization must respond include a variety of entities such as customers, suppliers, contractors, employees, business associates, legal and financial institutions, etc., both independent and in-house. Accordingly, as used in this document, "source" and "customer" are intended to include all such entities, unless clearly inappropriate in a particular context.

Similarly, "organization" is intended to encompass any person or entity having an interest in improving the conduct and recordation of communications. Finally, "transaction" is intended as a generic term referring to any provision or exchange of data or other information between the organization and the source, or vice versa.

Referring now to the drawings, FIG. 1 illustrates one embodiment of the invention.

As shown in FIG. 1, a system for improving the handling and communication of information using symbols is shown, generally depicted by reference numeral 10. The system includes an organization 20 and a source 30 of communications. For the purposes of this illustration, the source 30 is shown as being outside the organization 20. However, as already defined, the system of the present invention is also applicable when the source 30 is internal to the organization 20. Hence, both inter- and intra-organizational communication may be enhanced through the use of symbols, in accordance with the system and method of the present invention.

The organization, as representatively shown in FIG. 1, includes a central processing unit (CPU) 40, a memory 42, and a communications port 44. A scanning device or software 46 interfaces with at least one of the CPU 40 and the communications port 44. Through use of such scanning device or software 46, key words in text communications received may be identified in an automated manner to expedite accurate handling of the incoming communication and assignation of appropriate symbol(s). Finally, the organization includes a number of communications handlers 48 to whom communications are directed for action initiation.

The arrangement shown in FIG. 1 is representative only, as other hardware embodiments would also be effective in implementing and practicing the symbol-based method of the present invention.

Figure 2:
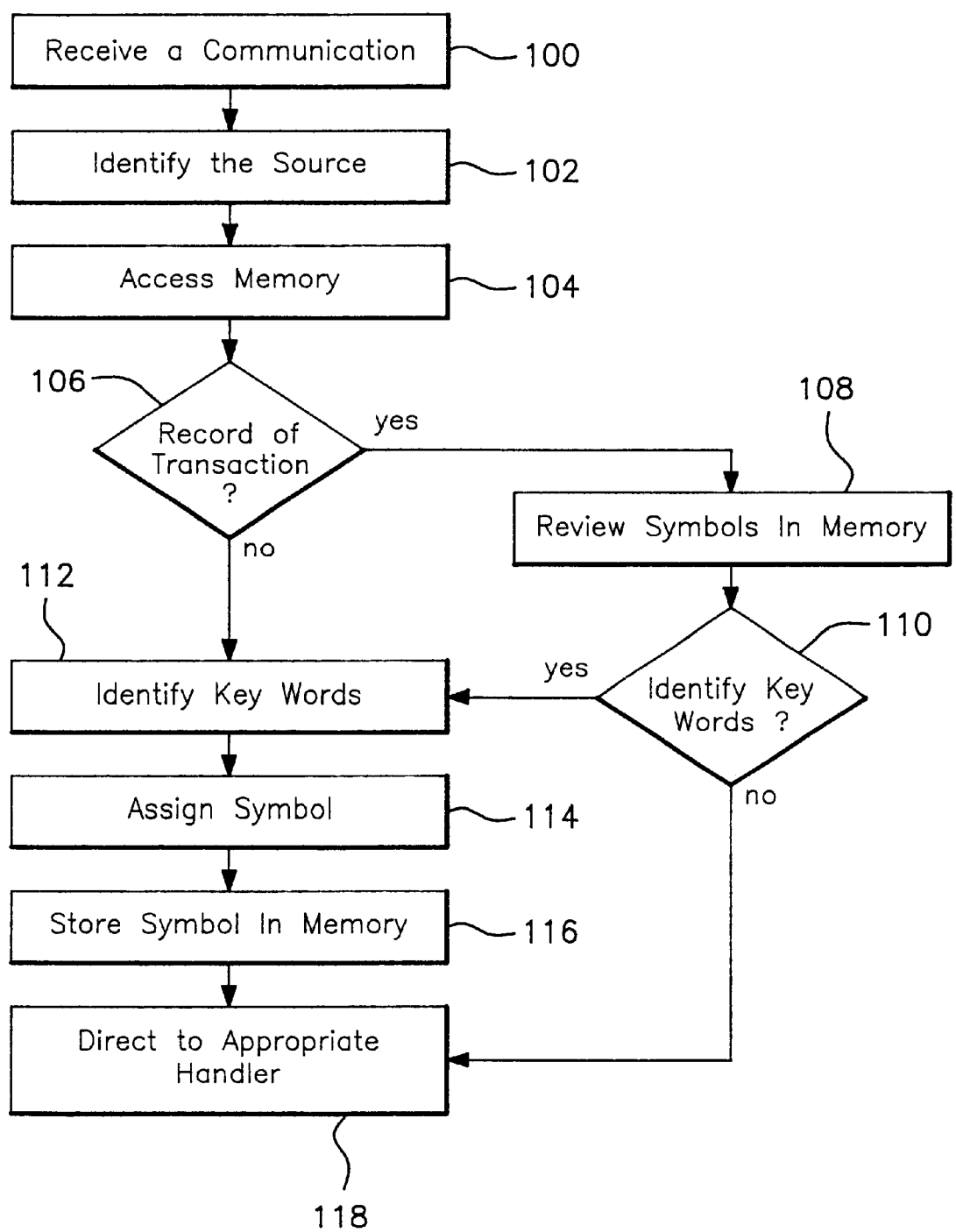
FIG. 2 is a flowchart illustrating an exemplary process by which a communication is received and directed using symbols that are assigned on the basis of key words within the communication, according to the present invention.

Turning now to FIG. 2, the present invention is directed to a method for improving the handling and communication of information by an organization through the use of symbols. These symbols are not merely representations of addressing information contained within a communication but, in the preferred embodiments, are intended within themselves to convey information pertaining to the substance or treatment of the communication. Symbols may also be embodied in less intuitive forms, such as alphanumeric characters, to accommodate hardware or other limitations, and the present invention is intended to extend to such embodiments.

A series of symbols create a record of transaction between a particular source and the organization. This record of transaction summarizes succinctly the present state of the relationship between the customer and the organization, as well as trends in service and satisfaction between the parties.

According to a preferred embodiment, the method of the present invention begins by receiving 100 a communication by the organization. Receipt of a communication from a source 30 most typically occurs through one or more of the organization's communications ports 44.

Upon receipt, the organization identifies 102 the source of the communication. For example, if the communication is from a customer, the source is identified as an individual, with the identification preferably including name, address, affiliation, etc. This identification can be accomplished using a scanning device or software 46, or through software designed to transparently track a caller's name and telephone number, or by directly querying the source, whether using automated technology or human operators. Alternatively, source identification may be limited to type, as in customer, supplier, advertiser, etc. Such identification may often be sufficient to route and handle the communication appropriately.

Once the source has been identified, the central processing unit 40 accesses 104 the memory 42 to determine whether a record of transaction 106 corresponding to the subject source is stored therein. If a record of transaction exists 106, the contents of the record are reviewed 108. The record of transaction may include a series of symbols documenting a chain of previous communications between the source and the organization. If present, such a series may be reviewed to determine how successful previous communications transactions were, particular likes and/or dislikes of the source, things to avoid, etc.

The record of transaction may also include a classifying symbol. The classifying symbol may have been assigned by the organization or by a third party. In the preferred embodiment, the classifying symbol rates the source according to value to the organization. This value may have been derived from the chain of previous communications with the organization. Alternatively, this value may have been assigned by a third party from whom information on the source was obtained. For example, the organization may be one that obtains consumer referral information from related industries. In one related industry, the source may have earned a rating indicating excellent credit. This rating would be assigned to the source and documented through the inclusion of a pertinent symbol in the source's referral information file. The organization 20 accessing 104 its memory and reviewing 108 the symbols in memory would have the benefit of that information as represented by the pertinent classifying symbol and would be able to direct the communication to an appropriate communication handler accordingly.

Having reviewed 108 the record of transaction, the central processing unit 40 may use the scanning device 46, or other means, to identify 110 key words within the communication. For example, if the communication had been delivered in the form of a facsimile or email, software or hardware capable of electronically scanning the communication could be used to identify the key words. Conversely, if the communication were to take the form of a telephone call, an interactive voice response (IVR) system may be used to identify key words.

In the preferred embodiment, key words are most typically words indicating a level of satisfaction or lack thereof. For example, an incoming communication may contain words such as "disappointed" or "angry"; such words would flag the communication as one to be directed to a communications handler suited for and experienced with handling difficult transactions. Similarly, contacts for whom a positive outcome has been indicated as likely may be routed to those operators who are particularly good as obtaining a successful outcome. Key words may also be those indicating a degree of urgency, the nature of the transaction desired, geographic location, or any other category of information that might be used to categorize and route the communication.

Depending upon the key words identified 112, a symbol is assigned 114 to the communication. The symbol itself may indicate the tone of the communication, may reflect an action believed to be desired, or may have another associated meaning which serves to categorize the communication. More than one symbol may be assigned if necessary to properly characterize the communication. A representation of the symbol or symbols is then stored 116 as part of the record of transaction in the memory, in a storage location corresponding to the source, as at least part of a communication summary; additional information and/or symbols may also be included in this communication summary. The communication is then directed 118 to a communication handler appropriate for that symbol or symbols.

The directing 118 of the communication may also take into consideration the symbols previously stored in memory and/or the identity of the source. In other words, while the symbol assigned on the basis of the key words would ordinarily direct the communication to, for example, a first handler, information obtained from the record of transaction and/or from having identified the source, may modify or override that direction and recommend instead a second handler. For example, in the case of a source identified as a premium source, the information from the source's record of transaction may indicate that the communication should be sent to a highly rated source relations handler, regardless of the nature of the particular communication. This may be particularly valuable in cases such as those involving a premium client known to travel extensively who happens to be overdue on a payment. Rather than directing a communication pertaining to the late payment to a collection handler, for example, the client would be transferred to a customer courtesy department.

If key words are not to be identified 110, the communication is directed 118 to an appropriate handler on the basis of the symbols that were reviewed 108 in memory. This style of routing can occur when the source has previously been tagged with a classifying symbol identifying the source in a particular manner, e.g., as a premier source, as a problem source, etc. Through such a classifying symbol, the organization is able to direct automatically all communications from that source to handlers best suited to whatever type of transaction has become largely standard for that source. This saves the time otherwise needed to scan the communication for key words and assign a symbol to be used to direct the communication.

Also in accordance with the method of the present invention, the step of storing 116 the symbol in a storage location in memory may be repeated for a plurality of symbols. Such a plurality of symbols may result from the assignment of multiple symbols to a single communication. For example, a first symbol may be assigned indicating a desired action, while a second symbol is assigned which indicates a projected outcome of the action. Directional symbols may also be assigned, indicating whether the communication is to be transferred laterally or moved up or down a chain of command. Specialized symbols may also be assigned on the basis of the subject matter of the communication.

A plurality of symbols may also represent a plurality of communications with that particular source over time. Each transaction has its own set of symbols, creating a record and a clear audit trail that can be used as evidence, for quality control, for training, etc. Through storage of a plurality of symbols representing a plurality of communications, a record of transaction between the source and the organization is created. This trail of symbols connects various communications and transactions and may be used for a variety of purposes, whether internally or externally, as evidence of prior contacts.

From the record of transaction, the organization may assign a classifying symbol to that source. As previously discussed, the classifying symbol may identify a level of the source's satisfaction with the organization, a level of the organization's satisfaction with the source, or some other indicator of the value of the source to the organization, or vice versa. Classifying symbols may be updated and changed as necessary to reflect recent developments in the record of transaction.

Classifying symbols may also be assigned on the basis of subrecords of transaction. For example, a source may have an excellent rating within the banking division of the organization while carrying a poor rating in connection with insurance services. The organization offering a suite of services can subdivide, using symbols, the source's record of transaction according to the subject matter of the communications contributing to that record to create subrecords of transaction. Each subrecord of transaction is related to a particular service of the organization and is assigned its own classifying symbol.

Figure 3:
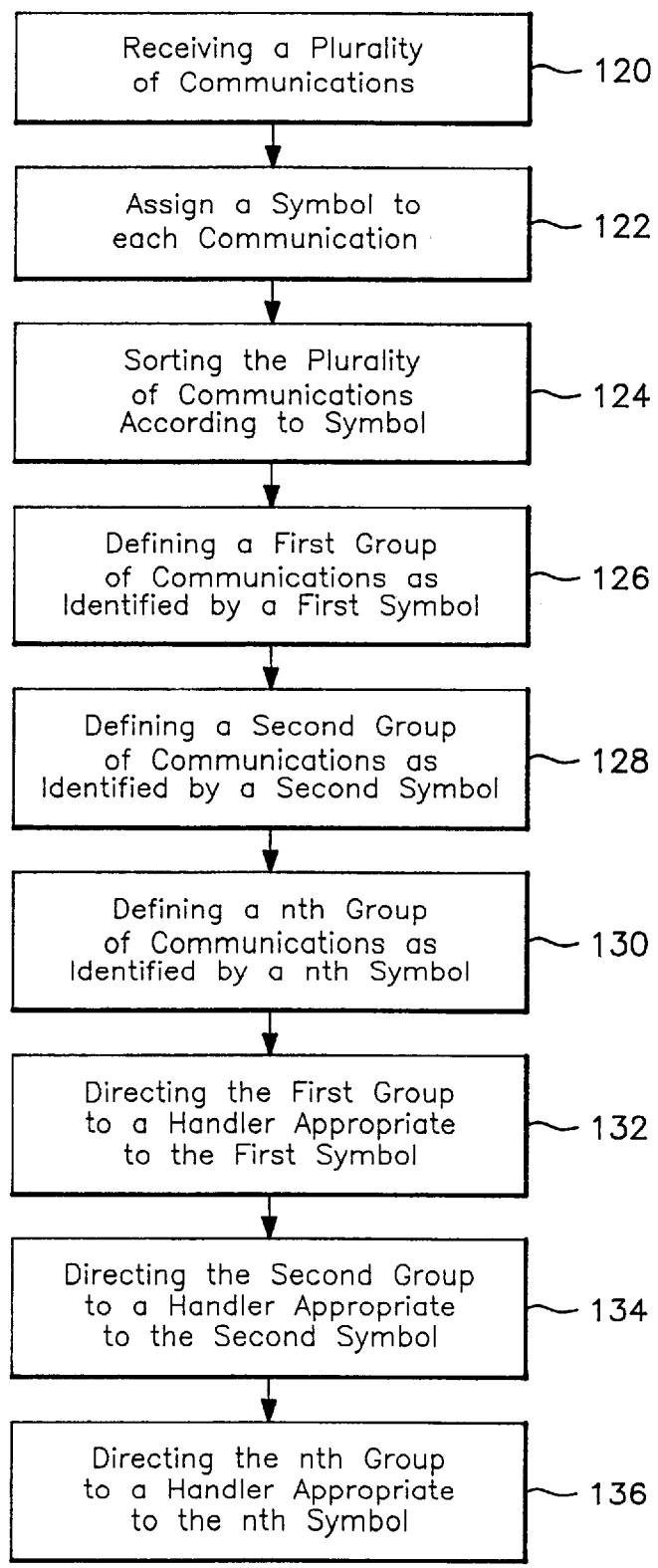
FIG. 3 is a flowchart illustrating an exemplary process by which a plurality of communications are received and sorted into groups on the basis of symbols assigned to each communication, according to the present invention.

The present invention provides not only a method of handling and recording multiple communications with a single source, but also a means of sorting, grouping and extracting within and from a plurality of communications. As shown in FIG. 3, the present invention may be used to receive 120 a plurality of communications and assign 122 a symbol to each communication. The plurality of communications is then sorted 124 according to symbol. Through such sorting, a first group of communications is defined 126 as identified by a first symbol, i.e., each communication within the first group has been assigned the same first symbol. A second group of communications is defined 128 as identified by a second symbol, i.e., each communication within the second group has been assigned the same second symbol. Similarly, the process continues until an nth group of communications has been defined 130 as identified by an nth symbol, with each communication within the nth group having been assigned the same nth symbol. The first group is then directed 132 to a communication handler appropriate to the first symbol, the second group is directed 134 to a communication handler appropriate to the second symbol, and the nth group is directed 136 to a communication handler appropriate to the nth symbol. The same concept may be applied to specified combinations of symbols.

Because multiple symbols may be assigned to each communication, the first, second and nth groups may or may not be mutually exclusive. For example, one communication may be tagged with a first symbol indicating a next action to be "respond today" while also being tagged with a second symbol indicating "check back in six months". In such a situation, the communication would be placed in both the first and second groups, as both are appropriate. In other situations, dependent upon the information being conveyed by the symbol, placement in more than one group would be inappropriate. The system of the present invention may be configured to implement automatic grammar-type checks to prevent the tagging of a single communication with conflicting or incongruous groupings of symbols.

The symbol-based method of the present invention further provides a convenient means of assessing the accuracy of customer evaluation, more specifically, of assessing the ability of organizational representatives to "read" the customers and accurately categorize their responses to and feelings about a transaction.

Figure 4:
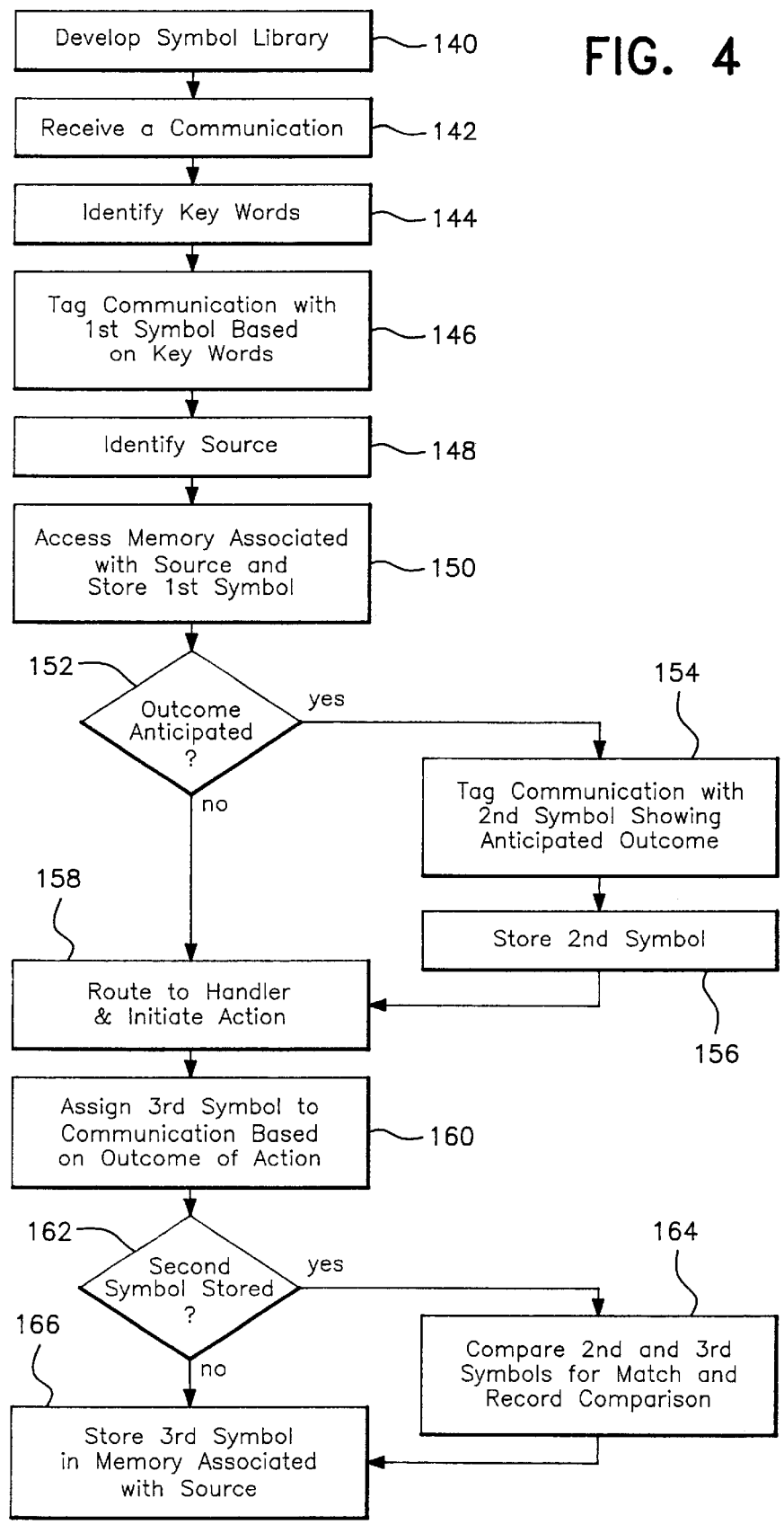
FIG. 4 is a flowchart illustrating an exemplary process by which a communication is received and processed using symbols, according to the present invention.

As illustratively shown in FIG. 4, the method of the present invention may begin by developing 140 a symbol library. Such a library may include a first plurality of symbols indicating a plurality of actions to be taken, and a second plurality of symbols indicating a projected outcome of the actions of the first plurality of symbols. The library may further include a number of pluralities of symbols for characterizing particular aspects of the communication. These might include a plurality of symbols indicating directional instructions or otherwise further defining the first or other plurality of symbols. Examples of symbol categories will be discussed in greater detail later in this document.

A communication is then received 142 at a central location. The central location may include any facility or location configured to receive communications, and representatively may be embodied as a call center, a web site or a center accessed through a web site, a facility for receiving mailed communications, etc.

In response to receiving 142 the communication at the central location, key words within that communication are identified 144. As already discussed, these key words may be identified using scanning or other automated technology. Based on the key words, the communication is tagged 146 with a first symbol indicating a first action.

The method continues by identifying 148 the source of the communication, accessing 150 the memory for a storage location associated with that source, and storing the first symbol in the accessed storage location. Based upon the symbols stored in the storage location and/or other inputs, a determination is made as to whether a particular outcome is anticipated 152. For example, if the record of transaction reveals a sequence of positive symbols, this may suggest that a positive outcome may be anticipated. Alternatively, if the communication contains negative key words this may suggest that a negative outcome may be anticipated.

If an outcome is anticipated 152, the communication is tagged 154 with a second symbol indicating the anticipated outcome. The second symbol is stored 156 in the storage location associated with the source and the communication is routed 158 to an appropriate communication handler who initiates the action on the basis of the first and second symbols. If an outcome is not anticipated 152, the communication is routed 158 to an appropriate communication handler who initiates the action on the basis of the first symbol alone.

Upon completion of the action indicated by the first symbol, a third symbol is assigned 160 to the communication on the basis of the actual outcome of the action. The third symbol is stored 166 in memory at the storage location associated with the source. The third symbol may also indicate a next action or other information.

If a second symbol had been stored 162, the second and third symbols are compared 164 for degree of match and the comparison results are stored. These comparison results may then be used by the organization to glean valuable information on the effectiveness of their representatives in dealing with customers, and on the ability of their representatives to accurately ascertain the customer's needs and level of satisfaction.

The present invention further provides a method whereby the customer, having transacted with the organization, can input their needs and level of satisfaction directly to the organization in a manner heretofore unknown in the prior art. Such direct input may be made possible through use of an electronic interface, such as a computer, with which the customer enters symbols using a keyboard and/or mouse or similar, including but not limited to, touch-screen input. Alternatively, the customer could enter symbols using the buttons on a telephone of such design. In the preferred embodiment, such input is received immediately upon completion of the transaction. In this way, the impression being carried by the customer is fresh and no additional contacts need to be initiated in order to complete the data collection or quality control process or similar transaction.

Figure 5:
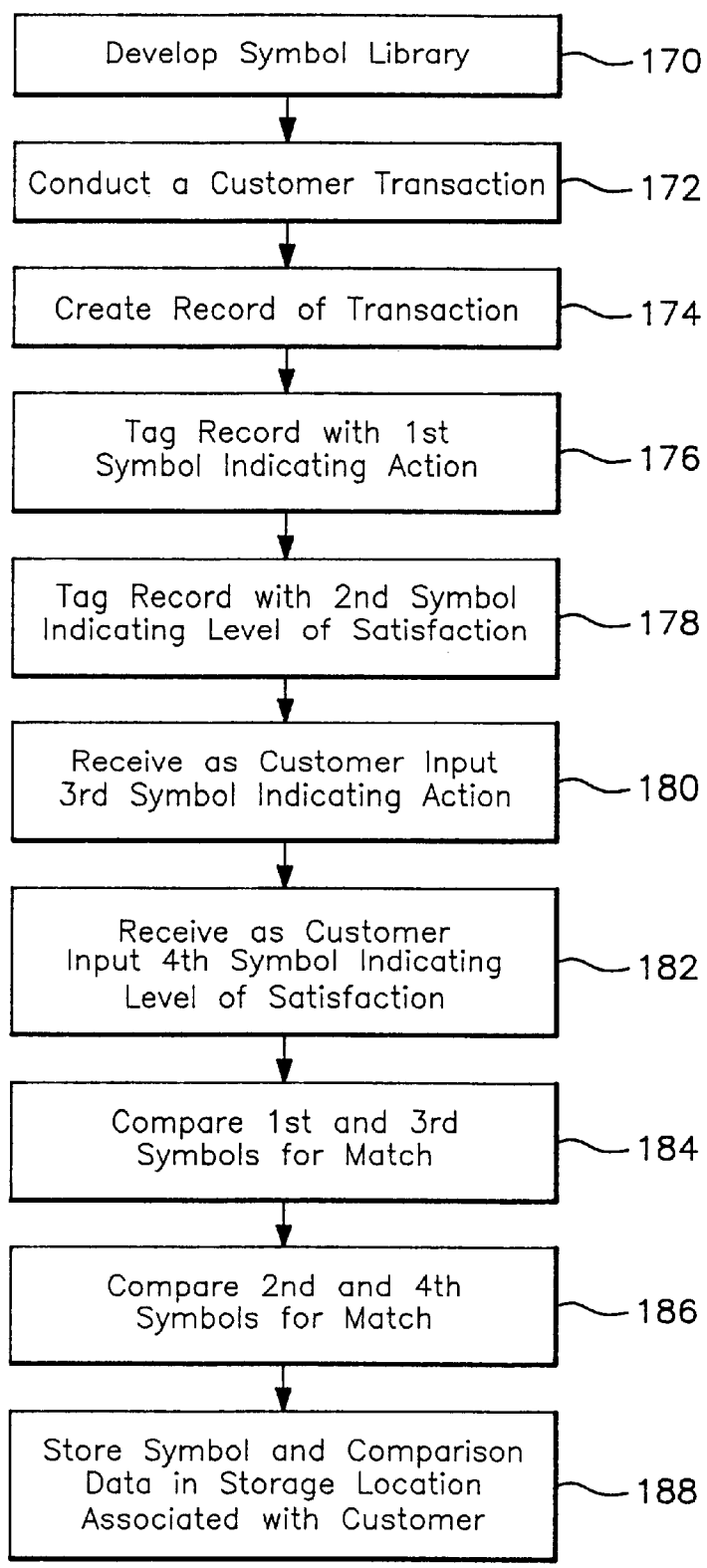
FIG. 5 is a flowchart illustrating an exemplary process by which customer inputs relative to a transaction are compared to organizational perceptions of the same transaction using symbols, in accordance with the present invention.

As representatively depicted in FIG. 5, the method begins by developing 170 a symbol library. This library may include a first plurality of symbols indicating a plurality of actions to be taken, and a second plurality of symbols indicating a level of satisfaction with the transaction. The library may further include symbols indicating a projected outcome of the actions of the first plurality of symbols, and/or symbols indicating directional instructions or otherwise further defining the communication or other symbols.

A customer transaction is conducted 172 and a record of transaction is created 174. In creating 174 the record of transaction, the communication is tagged 176 with a first symbol from the first plurality of symbols, indicating a next action to be taken as perceived by the organization. The communication is also tagged 178 with a second symbol from the second plurality of symbols which indicates the customer's level of satisfaction as perceived by the organization.

Following the transaction, the customer provides, and the organization receives, as input 180 a third symbol from the first plurality of symbols, indicating a next action to be taken as desired by the customer. The customer also provides, and the organization receives, as input 182 a fourth symbol from the second plurality of symbols which indicates the customer's actual level of satisfaction with the transaction.

The organization then compares 184 the first symbol with the third symbol, and compares 186 the second symbol with the fourth symbol. Through these comparisons, the organization can ascertain an accuracy level of the organization's perception of the customer and the transaction. Increased accuracy in perception leads to an enhancement in the quality of the interactions between the organization and the customer and, ultimately, an increase in customer satisfaction and retention.

The symbol and comparison data is ultimately stored 188 in the storage location associated with that customer.

Figure 6:
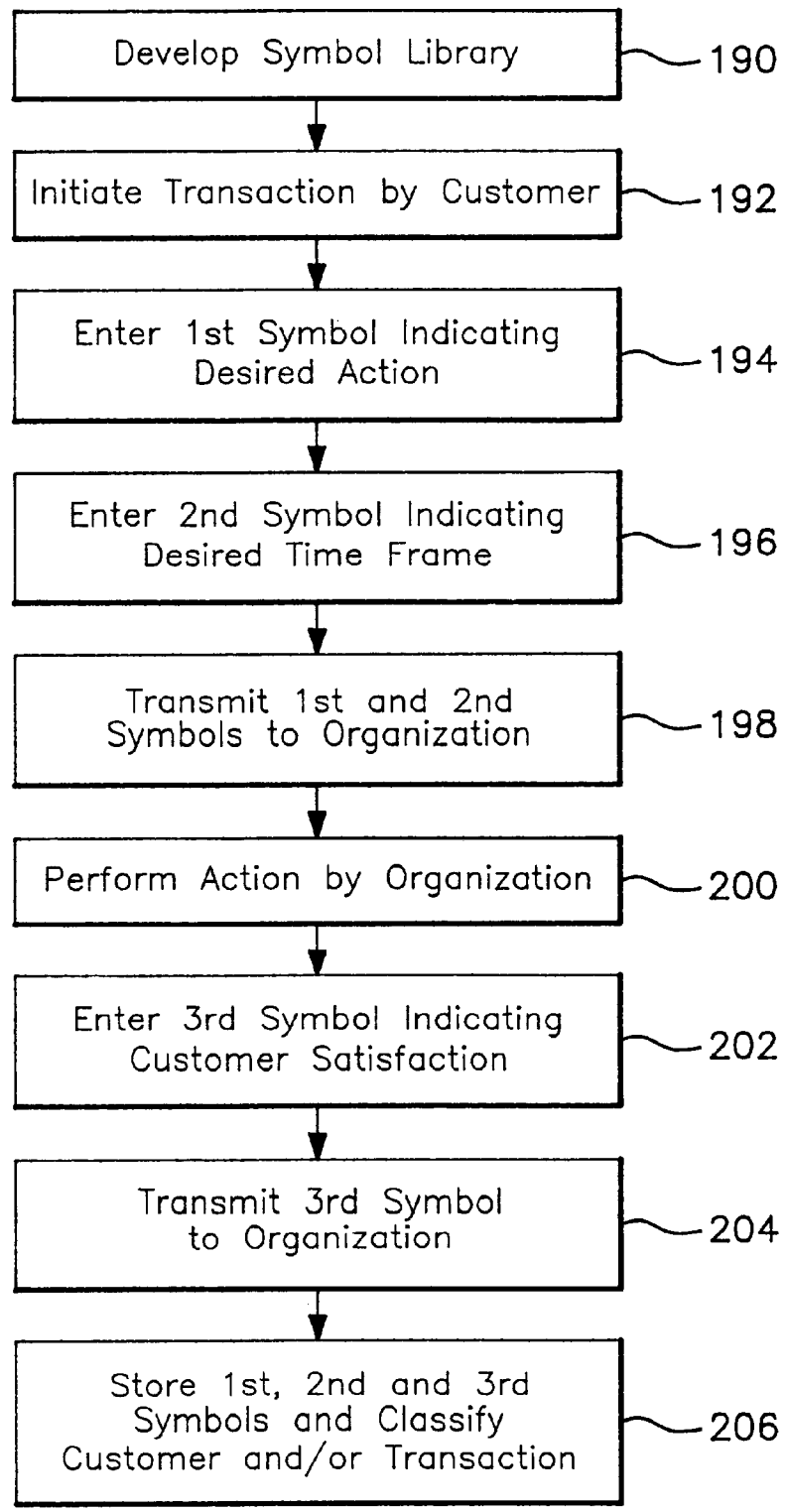
FIG. 6 is a flowchart illustrating an exemplary process by which a customer initiates a transaction with an organization, in accordance with the present invention.

An alternative embodiment of a method for enabling the customer to initiate transactions with an organization through entry of symbols over an electronic interface is representatively shown in FIG. 6. The method begins with development 190 of a symbol library. Such a library may include a first plurality of symbols, each of the first plurality of symbols indicating an action; a second plurality of symbols, each of the second plurality of symbols indicating a time period; and a third plurality of symbols, each the third plurality of symbols indicating a level of satisfaction. Additional or alternative pluralities of symbols may also be included in the symbol library.

Upon development 190 of the symbol library, the customer initiates 192 a transaction with the organization over an electronic interface. The customer enters 194 a first symbol from the first plurality of symbols, the first symbol indicating a desired action to be taken by the organization. The customer enters 196 a second symbol from the second plurality of symbols, the second symbol indicating a time period within which the customer would like the action to be taken. The customer then transmits 198 the first and second symbols to the organization. Upon receipt and processing of the first and second symbols, the organization performs 200 the indicated action, preferably within the indicated time period. The customer, in response to the action, enters 202 a third symbol from the third plurality of symbols, the third symbol indicating a level of customer satisfaction with the transaction, and transmits 204 the third symbol to the organization. Upon receipt and processing of the third symbol, the organization stores 206 the first, second and third symbols, and classifies at least one of the customer and the transaction according to the stored symbols.

Through implementation of any of the above-described customer-initiated transactions, the customer's needs can be specifically addressed in a timely, focused and efficient manner. The use of symbols provides a consistent interface and a uniform "language" between the customer and the organization that provides for avoidance of the misunderstandings that often arise from different interpretations of textual communications.

As should be clear, the present invention envisions the use of symbols in a wide variety of contexts in order to provide an efficient and efficacious form of communication which is readily understood and easily transferred from one industry to the next. Toward this end, the present invention also provides for the development of a symbolic language tool box with three levels of symbols.

Symbols on the first level, known as level-one symbols, apply across all sectors and applications, providing a common set of basic communication tools useable throughout the world. Symbols on the second level, level-two symbols, are useable within a sector but with some overlap expected among many sectors; such level-two symbols give each sector(s) a common set of basic communication tools. Finally, symbols on the third level, level-three symbols, are tailorable to the specific needs of a given user, conveying actions and concepts which are specific to that user. It is expected that, over time, there may be migration of some symbols from level three to level two, and perhaps some migration among other levels as well.

Symbols on each level may be grouped as container symbols and auxiliary symbols. However, the use of the word "container" is not meant to limit the symbols so designated to symbols having some sort of outer perimeter within which other designators are intended to be contained. Instead, the designation of "container symbols" is intended to depict a level of information. Accordingly, the container symbol may be presented in series with other container symbols and/or auxiliary symbols, with no nesting of the symbols whatsoever.

According to the preferred embodiment, level-one container symbols include an outbound container symbol, an inbound container symbol, an on hold container symbol, and a transfer/escalation container symbol. Other level-one container symbols may also be developed as needed. Examples of possible embodiments of such level-one container symbols are depicted in FIG. 7.

The outbound container symbol represents a need to be in contact with someone or to revisit an item or issue in the future. In a call center application, the outbound container symbol indicates that the next required action is an outbound call back. In the case of a personal organizer, the outbound container symbol indicates that the next required action is a call (or other communication such as e-mail, fax, etc.) or visit to a specified contact. Representatively, the outbound container symbol may be embodied as a square 60.

When the outbound container symbol is doubled, thickened, or otherwise visibly and distinguishably enhanced, modified or added to, a double square for example, this indicates an exercise of judgment by the user that the probable outcome of the process will be favorable, i.e., will conclude in a sale, a collection, a positive judgment, etc.

The inbound container symbol represents the expectation that a point of contact will initiate a contact with the user, or will bring up an item or issue with the user in the future. This can represent an expected inbound call back in a call center situation, or an expected receipt of evidentiary information from a client or a counter party in a legal or inspection situation, etc. The inbound container symbol may be representatively embodied as a circle 61.

As with the outbound container symbol, when the inbound container symbol is doubled, thickened, or otherwise visibly and distinguishably enhanced, modified or added to, a double circle for example, this indicates an exercise of judgment by the user that the probable outcome of the process will be favorable.

The on hold container symbol represents a situation of suspense for the initiative, transaction or process at issue. For purposes of illustration, the on hold container symbol may be embodied as a hexagonal symbol 62.

The transfer/escalation container symbol represents a situation in which the matter at hand needs to be transferred to another person or entity. Such a transfer may represent a lateral or downward transfer, or may direct escalation of the matter to an organizational superior. For purposes of illustration, the transfer/escalation container symbol may be embodied as a "routing rocket" symbol 63. In the preferred embodiment, the orientation of the rocket indicates the direction of the transfer/escalation required, e.g., a rocket pointing upward indicates that the matter needs to be escalated to an organizational superior, while a rocket pointing downward indicates a downward transfer of the matter is in order. Similarly, a rocket pointing to the right or to the left indicates a lateral transfer to another department or individual.

In addition to the level-one container symbols, the present invention includes a plurality of sector (level-two) and personalized (level-three) container symbols. These symbols or icons, depicted in FIG. 7, may include a drug bottle symbol 70, indicating medicines or medical procedures to be used for medical trials and drug compliance; a cake symbol 71, indicating a special occasion; a schoolhouse symbol 72, indicating school events; a folder symbol 73, indicating files used for legal or social services; a courthouse symbol 74, indicating legal case developments; a wrench symbol 75, indicating major repair or work; an eye symbol 76, indicating that something needs a closer look; and a light bulb 77, indicating a new idea to be circulated or escalated within an organization.

In addition to the container symbols, the present invention incorporates a number of auxiliary symbols. Auxiliary symbols add detail to the container symbols and are normally positioned within the defining borders of pertinent container symbols.

Auxiliary symbols or icons, depicted in FIG. 7, may include an exclamation point 80, indicating the matter to be important; a clock symbol 81, indicating the matter to be time sensitive; an arrow or boomerang symbol pointing down 82, indicating that attention is required later that day; an arrow or boomerang symbol pointing right 83, indicating that attention is required the next day; a question mark 84, indicating a question to be answered; a plus sign 85, indicating that additional information is required; an arrow or boomerang symbol pointing up 86, indicating that the matter needs to be escalated within the organization; and an "X" symbol 87, indicating that the contact no longer exists. The boomerang symbol or arrow pointing up may be incorporated into the transfer/escalation container symbol, as appropriate.

In addition to the container and auxiliary symbols, closure symbols may also be employed. These may include "OK", a "thumbs up" symbol or a happy face 88, all indicating a successful outcome; and "NO", a "thumbs down" symbol or an unhappy face 89, all indicating an unsuccessful outcome.

These symbolic graphics can be applied as a hand-written methodology in a paper-based setting or electronically through the use of writepads. These symbols may also be preprinted on a paper or electronic message pad or self-sticking type pad, giving the user the ability to check, strike through, circle, or otherwise indicate the symbol which the user wishes to record.

Software based on this invention allows sorting and other manipulation of information via clicks on symbols in combination with other commands, as well as the generation of management reports in a similar manner. The present invention also simplifies training for operators and managers. The ease with which information can be recognized and understood results in lower training costs and a quicker transition to productivity.

An additional benefit in the field of call centers involves the use of symbol-linked data in benchmarking studies. Benchmarking is a fundamental element for judging the efficiency and efficacy of call centers, and a major initiative is underway to generate benchmarking data on a global basis. Use of analytical data generated by symbols will serve to homogenize data across sectors and lead to better data.

The present invention also provides managers and individuals with a standardized, symbol-connected method for recording interactions that can be used subsequently by appropriate third parties. Such third parties to whom the recorded information may be passed include collection agencies, rating agencies and debt securitizers, lawyers and courts, outsource call centers, call center customers, customers of inspection service providers, volunteer fund raisers, individuals involved in medical sector testing and compliance projects, buyers of customer lists, and others.

In settings involving inspections, hand-held units which employ this invention can be used by inspectors to record essential elements of their observations in an easier and more direct way. The reduced need for routine text leaves more time for the substance of the inspection and for unique and important text. The use of symbols produces multiple benefits in terms of inspection time and accuracy, reducing the amount of time needed for report writing and follow-up, as well as increasing the ease and efficiency with which the report may be read. In cases involving periodic inspections, the placement of universally recognized symbols side-by-side also acts as a powerful communicator of information over time.

Software incorporating the present invention can also be used in personal organizers. By clicking on appropriate symbols, users can reduce the need for textual inputs, quickly comprehend what is required as a next step, and increase available options for storing, presenting, manipulating and reporting data. This application may be implemented using touch screens or voice activated software.

In a medical context, software in accordance with the present invention may be further linked with wireless and/or other technology to monitor a patient having a chronic condition; such a patient may or may not be part of a critical study.

The symbol-based system and method of the present invention may be adapted to enhance the recording and manipulation of data in any number of fields. To facilitate this, the present invention further includes a centralized symbol registration and organization service implemented, in a preferred embodiment, using a distributed computer communications network such as the Internet. Industry representatives may access a symbol registration web site and register individualized or sector-specific symbols and symbol systems with the service. Once registered, these symbols are included in a symbol database accessible through the web site for the purposes of commercial and non-commercial applications. These symbols may also be incorporated into software upgrades and distributed to interested users as appropriate. The web site provides a centralized source of symbol information and a hub for users interested in learning more about how the use of symbols in accordance with the present invention can enhance their own communication and information handling capabilities.

The symbol-based system and method of the present invention may also be designed as an overlay application to be used in conjunction with existing software packages. As such an overlay application, symbol-based communication not only links and clarifies the information captured by the underlying software but enables organizations already invested in particular software systems to benefit from the present invention without the need to acquire an entirely new software suite.

The symbol-based system and method of the present invention may also be powerfully applied to research, training and other efforts directed to communication with animals, and to the recording and monitoring of animal behavior.

The foregoing descriptions and drawings should be considered as illustrative only of the principles of the invention. The invention may be configured in a variety of configurations and is not limited by the configuration of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method for improving handling and communication of information by an organization through use of symbols, comprising the steps of:

receiving, by the organization, a written communication from a source;

scanning and identifying key words within text of the communication, said key words being other than specific addressing information within the communication;

assigning, responsive to the key words identified, a symbol to the communication, said symbol having an associated meaning which indicates an action required to be undertaken by the organization in response to the communication;

storing, as at least part of a communication summary, a representation of the symbol in a storage location corresponding to the source; and directing, based on the symbol, the communication to a communication handler within said organization appropriate for handling the action indicated by that symbol.

2. The method as set forth in claim 1 wherein the step of storing includes the step of:

storing a plurality of symbols in the storage location corresponding to the source, each of said plurality of symbols representing a previously completed communication exchange between said source and said organization, the plurality of symbols together thus representing a chain of communications with that source and creating a record of transaction between the source and the organization.

3. The method as set forth in claim 2, further comprising the step of:

assigning a classifying symbol to the source on the basis of the record of transaction, the classifying symbol indicating at least one of a level of source satisfaction with the organization and a level of organization satisfaction with the source.

4. The method as set forth in claim 2, further comprising the steps of:

subdividing the plurality of symbols within the record of transaction according to subject matter of the communications to create a plurality of subrecords of transaction, each subrecord of transaction including communications having subject matter relating to a particular service of the organization; and assigning a classifying symbol to each subrecord of transaction, the classifying symbol indicating at least one of a level of source satisfaction with the organization and a level of organization satisfaction with the source.

5. The method as set forth in claim 2, wherein said plurality of symbols are non-alphanumeric symbols.

6. The method as set forth in claim 1, further comprising the steps of:

accessing a memory for an existing storage location associated with the source;

reviewing a plurality of previously stored symbols within the existing storage location, each previously stored symbol representing an outcome of a previously completed communication exchange between said organization and said source, said plurality of previously stored symbols when taken together defining a record of transaction between the source and the organization.

7. The method as set forth in claim 6, wherein said stored symbols include a reference symbol not associated with the record of transaction, said reference symbol having been assigned to the source by a third party.

8. The method as set forth in claim 7, wherein the step of directing is accomplished based on at least two of the symbol assigned, the source, and the reference symbol.

9. The method as set forth in claim 1 wherein the step of receiving a written communication includes receiving at least one of a facsimile or an email.

10. The method as set forth in claim 9 wherein the step of scanning the communication is performed electronically.

11. The method as set forth in claim 9 wherein the step of receiving a written communication includes receiving and opening an email.

12. The method as set forth in claim 1, further comprising the steps of:

receiving a plurality of communications;

sorting the plurality of communications according to the symbol assigned to each communication such that groups of communications are compiled, each group of communications being defined by a common symbol assigned to each communication within the group.

13. The method as set forth in claim 1, wherein said symbol is a non-alphanumeric symbol.

14. A method for enabling an organization to monitor customer satisfaction with a transaction using symbols, the method comprising the steps of:

developing a first plurality of symbols, each of said first plurality of symbols indicating an action;

developing a second plurality of symbols, each of said second plurality of symbols indicating a level of satisfaction;

conducting a transaction with a customer over an electronic interface;

creating, by the organization, an electronic record of the transaction;

tagging the record with a first symbol from the first plurality of symbols, the first symbol indicating a next action to be taken as perceived by the organization;

tagging the record with a second symbol from the second plurality of symbols, the second symbol indicating a level of customer satisfaction as perceived by the organization;

inputting to the electronic interface, by the customer, a third symbol from the first plurality of symbols, the third symbol indicating a next action to be taken as desired by the customer;

inputting to the electronic interface, by the customer, a fourth symbol from the second plurality of symbols, the fourth symbol indicating a level of customer satisfaction as experienced by the customer;

receiving, by the organization over the electronic interface, the third symbol and the fourth symbol;

comparing., by the organization, the first symbol to the third symbol and the second symbol to the fourth symbol to ascertain an accuracy level of the organization's perception of the transaction.

15. The method as set forth in claim 14 therein the electronic interface is a computer and the customer enters the third and fourth symbols using a keyboard.

16. The method as set forth in claim 14 further comprising the step of:

recording a representation of the symbols in a storage location associated with the customer to create a customer transaction record.

17. The method as set forth in claim 14, wherein said first plurality of symbols and said second plurality of symbols are non-alphanumeric symbols.

18. A method for intelligently routing a communication using symbols and for assessing an accuracy of organizational perception of customer satisfaction, the method comprising the steps of:

developing a first plurality of symbols, each of said first plurality of symbols indicating one of a plurality of actions;

developing a second plurality of symbols, each of said second plurality of symbols indicating one of a level of satisfaction;

receiving at an organization a written communication from a customer;

scanning, by the organization, the communication and identifying within the communication key words;

accessing, by the organization, a memory for a storage location associated with the customer;

reviewing a plurality of symbols stored in said customer storage location, said plurality of symbols representing a series of previously completed transactions with said customer;

tagging, responsive to the key words and to said plurality of symbols stored in said customer storage location, the communication with a first symbol of the first plurality of symbols, the first symbol indicating a first action to be undertaken by said organization;

storing a representation of the first symbol in the customer storage location;

routing the communication to a communication handler at said organization appropriate for undertaking the first action as indicated by the first symbol;

receiving the communication by the handler;

initiating, responsive to the first symbol, the first action;

tagging the first symbol as stored in said customer storage location with a second symbol of the second plurality of symbols, said second symbol indicating a level of customer satisfaction perceived by said organization;

receiving, by said organization as input from said customer, a third symbol of the second plurality of symbols indicating a level of satisfaction as experienced by said customer;

tagging the first symbol as stored in said customer storage location with the third symbol; and comparing, by said organization, the second and third symbols to ascertain the accuracy level of said organization's perception of customer satisfaction.

19. The method as set forth in claim 18, wherein said first plurality of symbols, said second plurality of symbols, and said plurality of symbols stored in said customer storage location are non-alphanumeric symbols.

* * * * *